Patented Dec. 29, 1931

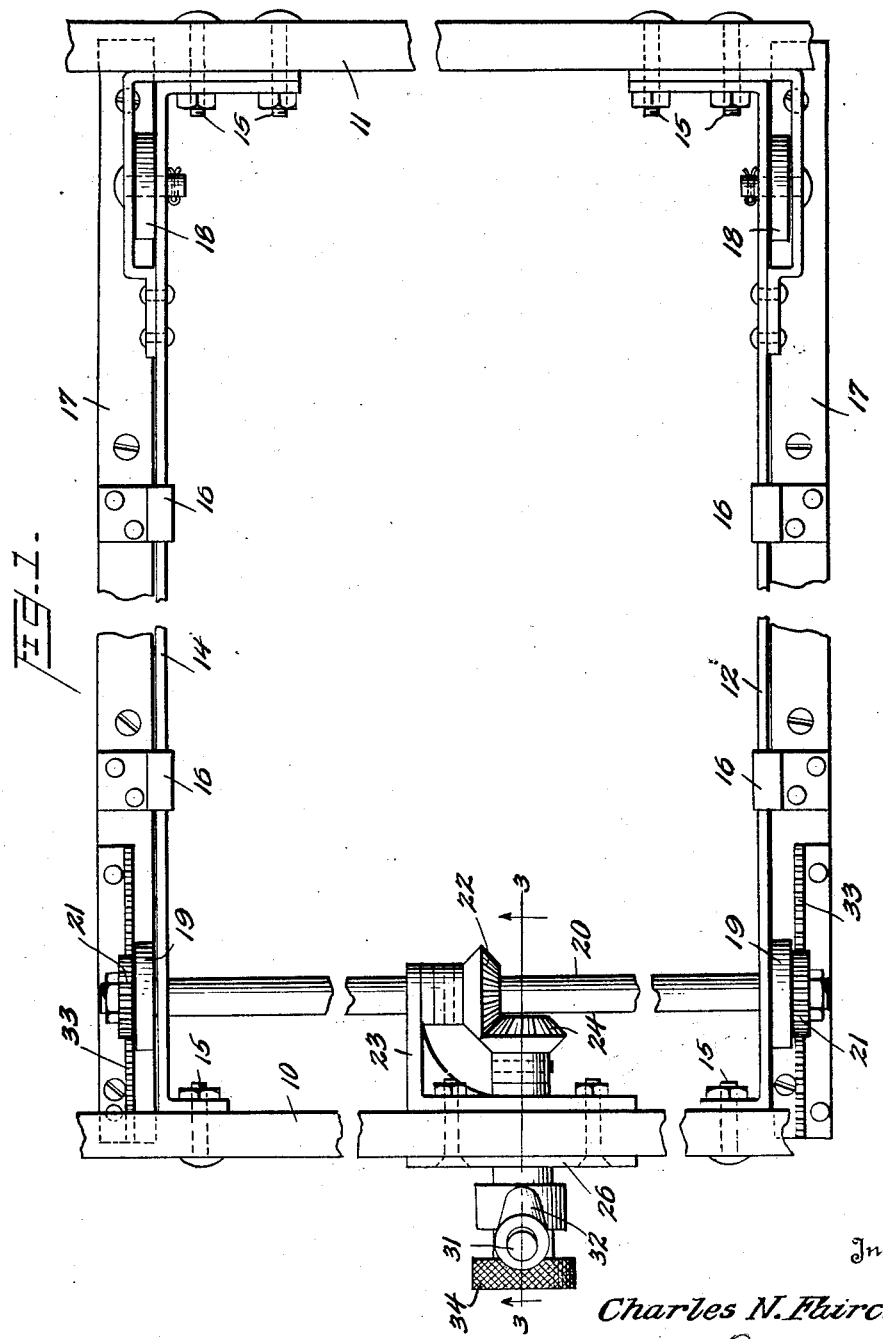

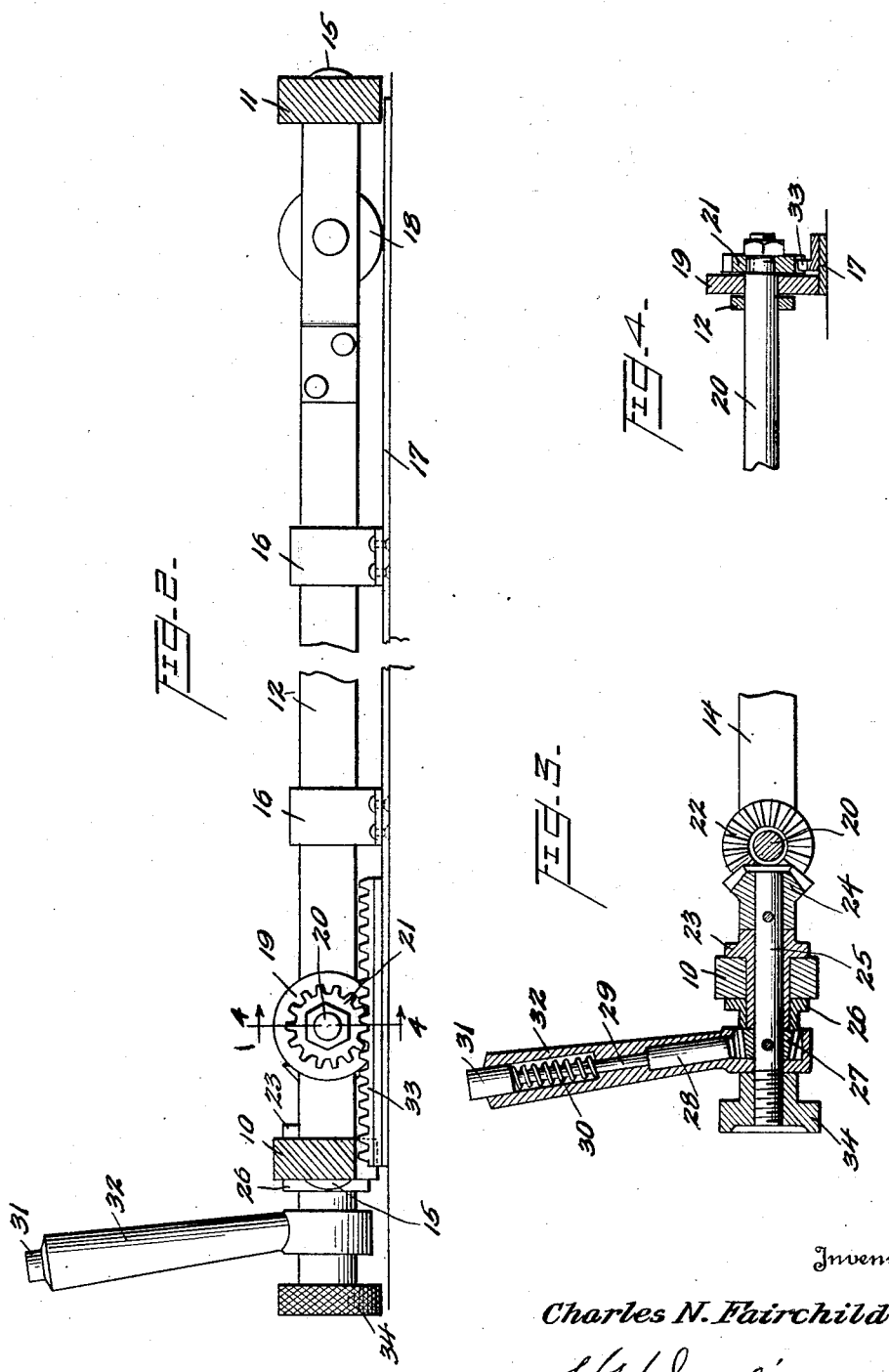

1,838,303

UNITED STATES PATENT OFFICE

CHARLES N. FAIRCHILD, OF NEW HAVEN, CONNECTICUT, ASSIGNOR TO FAIRCHILD LOCK CORPORATION, OF PLANTSVILLE, CONNECTICUT, A CORPORATION OF DELAWARE

GEAR OPERATED SEAT

Application filed February 20, 1929. Serial No. 341,495.

This invention relates to adjustable seats for automobiles and has for its principal object the provision of a simple and efficient adjuster primarily one which can be so placed as not to interfere with the necessary storage space beneath the seat to receive, for example, the tool box and the battery and which adjuster in addition shall be so positioned as to require extremely little overhead, preferably the total height not exceeding two inches.

While there are a number of adjustable seats represented in existing patents they are all objectionable for one reason or another and there are none on the market that provide low clearance, a large unobstructed space, ease of manipulation, and ability to hold the seat in adjusted position. One object of the invention is to provide a seat which will have these four advantages, which in addition shall be so guided as to obviate binding as sometimes occurs when the seat is driven by means near one end or side.

In the drawings:—

Figure 1 is a plan view.

Figure 2 is a side elevation.

Figure 3 is a section on line 3—3 of Figure 1.

Figure 4 is a section on line 4—4 of Figure 2.

The seat frame includes a front bar 10 and a rear bar 11 which may be connected by the usual wooden side pieces which are not shown as they form no part of the invention. In one sense the metal strips 12 and 14 form the sides of the seat frame for each of these strips extends unbroken from one bar of the frame to the other and are secured to the two bars as by the bolts 15. The side straps 12 and 14 are centrally guided by the members 16 which are riveted to the steel tracks 17 on which ride the rolls 18 at the rear of the frame and the rolls 19 which are loosely mounted on the transverse drive shaft 20 which has bearings in the two metal side bars 12 and 14 and carries pinions 21 which are keyed to the shaft and are held thereto in any desired manner.

A beveled gear 22 pinned to the drive shaft 20 near its bearing in the bracket 23 meshes with a beveled gear 24 fast to the stud shaft 25 which latter has a bearing in the bracket 23 and also in a front plate 26 which positions the ratchet wheel 27 fast on the stud shaft. The ratchet wheel is adapted to be engaged by a pawl 28 on a rod 29 which is spring pressed as at 30 to hold the pawl out of engagement with the ratchet wheel. By means of a small extension 31 projecting beyond the top of the lever 32 the pawl may readily be thrown into engagement with the ratchet wheel so as to drive the stud shaft 25 and thru the meshing gears 22 and 24 to drive the shaft 20 to cause the pinions to travel on the racks 33 fast to the track 17. By having two of these racks correct alinement is given to the seat so that I may eliminate two or more of the guides 16 altho I prefer to retain them. The nut 34 has a threaded engagement with the stud shaft so that by a slight turn of its knurled head the ratchet lever 32 which is freely mounted on the shaft 25 may be locked to the stationary boss of the front plate 26 forming a very simple and efficient means for locking the drive shaft 20 against movement.

As illustrated, the seat, which may be single as in a coach or double as in a sedan, is in the middle of its travel. By pressing down on the projecting knob or thumb piece 31 the pawl 28 is caused to engage the ratchet wheel 27 so that a movement of the lever to the right will cause the pinions to move the seat forwardly on the racks 33 while a movement to the left will cause the seat to be projected further from the instrument board. In order to secure a very easy pull the pinions 21 have been made almost as large as the very limited clearance will permit but even with these large pinions it requires very slightly in excess of a half revolution to move the seat from the mid position illustrated to its extreme limit of travel which is more than two inches each way from the mid position. Practically this entire movement may be had therefore by a single sweep of the ratchet adjusting lever 32 from near the floor at one side to engagement with the floor at the other side altho usually it is preferred to make a number of turns thru a relatively smaller angle particularly since a motion of this kind is familiar to the user and also because of its greater convenience.

It will be noted that the space between the two side strips 12 and 14 and between the shaft 20 and the rear bar 11 is entirely free and unobstructed and this space under the seat cushion may therefore be used for a tool box and usually for the battery as well. As actually installed in practice the seat adjuster assembly requires a clearance of only two inches which is the height of the top of the rolls over the bottom of the steel track and is also the distance between the top of the wood bars of the seat frame and the floor. While there is ample room for a somewhat longer lever than the one illustrated in the drawings I find that a lever approximately five inches from shaft to tip is amply long to give a very easy pull. This lever obviously is in front of the seat and within easy reach.

What I claim is:

In a driving assembly for adjustable seats, a shaft supported only between its two ends, a ratchet wheel on said shaft, a lever loose on said shaft, a spring pressed pawl carried by said lever and adapted to engage said ratchet to drive said shaft in either direction, means located on the opposite side of the shaft support from the lever for moving the support in the direction of the shaft axis, a collar stud fixed to said support and in frictional engagement with one side of said loose lever, an adjustable nut on said shaft in frictional engagement with the other side of said lever whereby said lever may be locked against movement thereby holding the seat in any predetermined position.

In testimony whereof I affix my signature.

CHARLES N. FAIRCHILD.